United States Patent
Lee et al.

(10) Patent No.: US 12,430,929 B2
(45) Date of Patent: Sep. 30, 2025

(54) LANE LINE DETECTION METHOD, VEHICLE-MOUNTED DEVICE AND STORAGE MEDIUM

(71) Applicant: HON HAI PRECISION INDUSTRY CO., LTD., New Taipei (TW)

(72) Inventors: Chieh Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 371 days.

(21) Appl. No.: 18/125,680

(22) Filed: Mar. 23, 2023

(65) Prior Publication Data
US 2024/0203134 A1    Jun. 20, 2024

(30) Foreign Application Priority Data
Dec. 20, 2022  (CN) .......................... 202211642793.8

(51) Int. Cl.
*G06V 20/56*  (2022.01)
*G06T 7/70*   (2017.01)
*G06V 10/28*  (2022.01)

(52) U.S. Cl.
CPC .............. *G06V 20/588* (2022.01); *G06T 7/70* (2017.01); *G06V 10/28* (2022.01); *G06T 2207/20084* (2013.01); *G06T 2207/30256* (2013.01)

(58) Field of Classification Search
None
See application file for complete search history.

(56) References Cited

U.S. PATENT DOCUMENTS

| | | | |
|---|---|---|---|
| 2018/0129887 A1* | 5/2018 | Kang | ........................ G06T 7/70 |
| 2020/0074190 A1* | 3/2020 | Khakharia | ............. G06N 3/045 |
| 2022/0291373 A1* | 9/2022 | Nirula | ................... G01S 13/867 |

* cited by examiner

*Primary Examiner* — Leon Viet Q Nguyen
(74) *Attorney, Agent, or Firm* — ScienBiziP, P.C.

(57) ABSTRACT

A lane line detection method applied to a vehicle-mounted device is provided. In the method, the vehicle-mounted device converts a foreground image into a bird's-eye view (BEV) image, sets a peak of a horizontal histogram of the BEV image as a starting point for moving the sliding window, and generate a main lane line by fitting multiple non-zero pixels of the horizontal sliding window. The vehicle-mounted device calculates a confidence coefficient of each horizontal sliding window; and sets a previous one before the preset number of continuous horizontal sliding windows as a previous horizontal sliding window and determines an end point of the main lane line according to the previous horizontal sliding window when the confidence coefficients of preset number of continuous horizontal sliding windows are less than a predetermined threshold. The method improves accuracy of identifying lane lines.

20 Claims, 6 Drawing Sheets

LANE LINE DETECTION METHOD, VEHICLE-MOUNTED DEVICE AND STORAGE MEDIUM

FIELD

The present disclosure relates to a vehicle technology, in particular to a lane line detection method, a vehicle-mounted device, and a storage medium.

BACKGROUND

Lane line detection is an important technology in unmanned driving or assisted driving scenarios. Lane line detection refers to a detection of traffic indication lines (e.g., lane lines) on the road. Based on the lane line detection, it can be determined whether the vehicle has deviated during driving. If the lane line cannot be accurately identified, it will affect the safe driving of the vehicle. Therefore, it is necessary to accurately identify lane lines in an intelligent driving technology.

DETAILED DESCRIPTION

To more clearly understand the present disclosure, some definitions of selected terms employed in the embodiment are given. The definitions include various examples and/or forms of components that fall within the scope of a term and that may be used for implementation. The examples are not intended to be limiting. Furthermore, the components discussed herein, may be combined, omitted, or organized with other components or into different architectures.

It should be noted that, in this disclosure, "at least one" refers to one or more, and "a plurality of" refers to two or more than two. "And/or" refers to an association relationship between associated objects, representing that three relationships may exist. For example, A and/or B may include a case where A exists separately, A and B exist simultaneously, and B exists separately. Wherein A and B may be singular or plural. The terms "first", "second", "third", "fourth", etc. in the description and claims and drawings of the disclosure are used for distinguishing similar objects, rather than for describing a specific sequence or order.

In order to solve a technical problem that stop lines in a road cannot be accurately identified by image recognition technology in the prior art, the embodiments of the disclosure provide a lane line detection method, which is applied to a vehicle-mounted device. End points and stop lines of the main lane line can be determined according to a horizontal bird's-eye view (BEV) image and a vertical BEV image, which ensures driving safety of the vehicle effectively and improves the driving experience.

To more clearly understand a lane line detection method and related device that provided by the embodiments of the present disclosure. The following description describes an application scenario of the lane line detection method.

Figure 1:
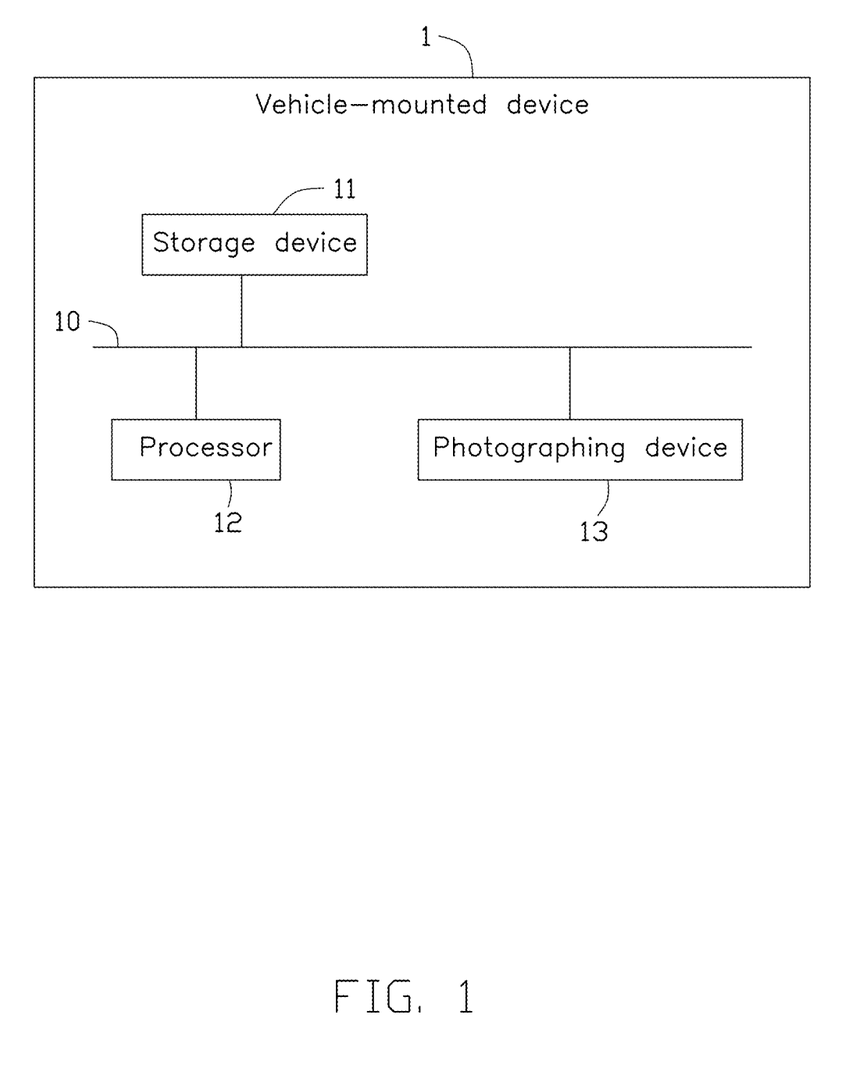
FIG. 1 is a schematic structural diagram of a vehicle-mounted device provided by an embodiment of the present disclosure.

FIG. 1 is a schematic structural diagram of a vehicle-mounted device provided by an embodiment of the present disclosure. As shown in FIG. 1, the vehicle-mounted device 1 includes, but is not limited to, a storage device 11, at least one processor 12 and a photographing device 13 connected to each other through a communication bus 10. The photographing device 13 may be a vehicle-mounted photographing device or an externally connected vehicle photographing device, such as a camera or a driving recorder, which can capture multiple images or videos in front of the vehicle. For example, the vehicle-mounted device 1 may be in communicative connection with a drive recorder in the vehicle and acquire images or videos from the drive recorder.

It should be understood by those skilled in the art that the structure of the vehicle-mounted device 1 illustrated in FIG. 1 does not constitute a limitation of an embodiment of the present invention, and that the vehicle-mounted device 1 may also include more other components, or less components, or combine some components, or replace some components. For example, the vehicle-mounted device 1 may also include input and output devices, network access devices, and the like.

In at least one embodiment of the present disclosure, the vehicle-mounted device 1 is applied in a vehicle, for example, the vehicle-mounted device 1 can be a vehicle-mounted device (for example, a vehicular device) in a vehicle or can be an independent electronic device (for example, a computer, a mobile phone, a notebook computer and so on). The vehicle-mounted device 1 can communicate and interact data with other on-board equipment of the vehicle, to realize the control of the vehicle.

Figure 2:
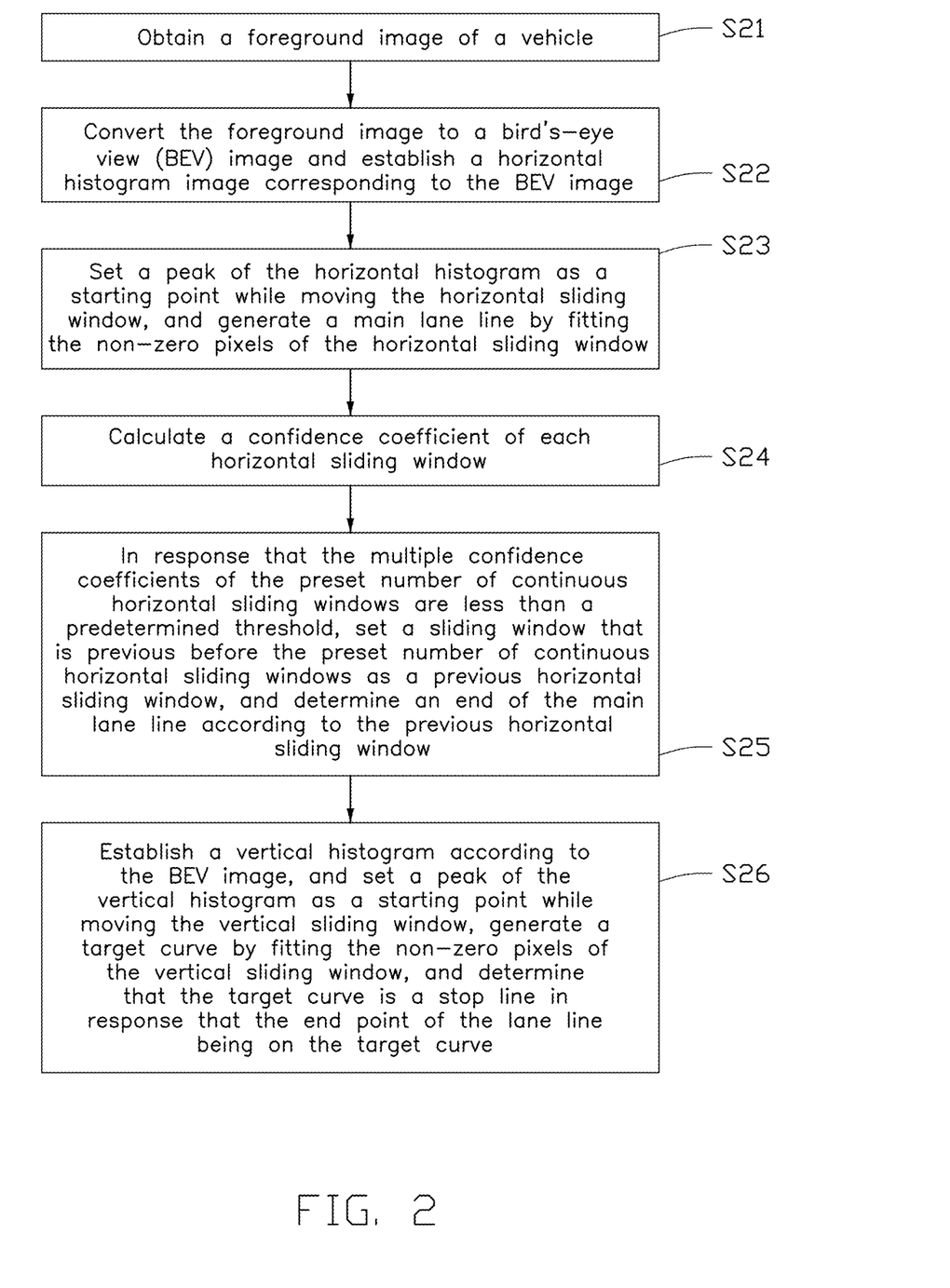
FIG. 2 is a flowchart of a lane line detection method provided by an embodiment of the present disclosure.

FIG. 2 is a flowchart of a lane line detection method provided by an embodiment of the present disclosure. The lane line detection method can be performed by using a vehicle-mounted device (for example, the vehicle-mounted device 1 of FIG. 1). According to different requirements, an order of each block in the flowchart can be adjusted according to actual detection requirements, and some blocks can be omitted. In at least one embodiment, the lane line detection method can include the following blocks.

In block 21, the vehicle-mounted device obtains a foreground image of the vehicle.

In an embodiment of the present disclosure, the foreground image may be an image captured according to a front view of a driving direction while the vehicle is driving. The vehicle-mounted device obtains the foreground image by capturing a foreground image in front of the vehicle. Alternatively, the vehicle-mounted device obtains the foreground image from a video of a scene captured in front of the vehicle.

In one embodiment, the vehicle-mounted device includes a photographing device, the first foreground image may be acquired by the photographing device of the vehicle-mounted device. In another embodiment, the vehicle-mounted device does not include any photographing device, the foreground image may be acquired by using a photographing device (such as a driving recorder) on the vehicle.

The vehicle-mounted device acquires the foreground image according to a communication with the photographing device on the vehicle.

In block 22, the vehicle-mounted device converts the foreground image to a bird's-eye view (BEV) image and establishes a horizontal histogram image corresponding to the BEV image.

In at least one embodiment, the first foreground image may be distorted due to problems such as angles, rotations, and zooms when the photographing device is shooting the foreground image. It is necessary to perform a distortion correction on the foreground image.

In at least one embodiment, before converting the foreground image to the BEV image, there is a need to perform the distortion correction on the foreground image. The vehicle-mounted device performs the distortion correction on the foreground image by: establishing an image coordinate system according to the foreground image, and obtaining a first coordinate of each non-zero pixel of the foreground image from the image coordinate system; obtaining the internal references of the paragraphing device, and determines a second coordinate corresponding to the first coordinate according to the internal references and the first coordinate. The second coordinate is an undistorted coordinate. The vehicle-mounted device determines a distortion distance between the first coordinate and a center coordinate of the foreground image, calculates an image complexity of the foreground image according to a grayscale value of each pixel of the foreground image, and determines multiple correction parameters of the foreground image according to the image complexity, and determines a smoothing coefficient corresponding to the distortion distance and the correction parameter according to a preset smoothing function, and obtains the corrected image by performing a smooth correction on the first coordinate according to the smoothing coefficient and the second coordinate.

After obtaining the corrected image, the vehicle-mounted device sets each non-zero pixel of the corrected image as a target point and obtains an inverse perspective transformation matrix by performing a coordinate transformation on each target point of the corrected image; converts the corrected image to the BEV image according to the inverse perspective transformation matrix. In detail, the vehicle-mounted device obtains a binary image according to the corrected image by performing an image grayscale, a gradient threshold, a color threshold, and a saturation threshold preprocessing on the corrected image, for removing irrelevant lane lines information of the corrected image. The vehicle-mounted device obtains the inverse perspective transformation matrix by using the coordinate transformation formula. In at least one embodiment, the target point is the non-zero pixel of the corrected image based on the approximately parallel characteristics of the lane lines on the same road; and the vehicle-mounted device obtains the BEV image by performing a perspective transformation on the binary image based on the inverse transformation matrix. The BEV image is a three-dimensional map based on the principle of perspective, which is drawn from a certain point on a high place looking down on the undulations of the ground by using the high viewpoint method, which is more realistic than the plan view.

In at least one embodiment, the vehicle-mounted device establishes the horizontal histogram image corresponding to the BEV image by: establishing a horizontal histogram based on the non-zero pixels corresponding to a lower half of the BEV image and obtaining peaks of the horizontal histogram according to a total number of non-zero pixels in each column. For example, the peaks may include the first peak and the second peak.

In block 23, the vehicle-mounted device sets a peak of the horizontal histogram as a starting point while moving the horizontal sliding window, and generates a main lane line by fitting the non-zero pixels of the horizontal sliding window.

In an embodiment of the present disclosure, the vehicle-mounted device searches for the main lane line through horizontal sliding window according to the obtained first peak and second peak, the vehicle-mounted device searches for the left main lane line by: setting the peak of the horizontal histogram as a starting point for moving the horizontal sliding window; calculating a first average value of the horizontal coordinates of all non-zero pixels in the previous horizontal sliding window of the current horizontal sliding window; setting the first average value as a first horizontal coordinate average value; determining a horizontal center of the current horizontal sliding window according to the first horizontal coordinate average value; determining a position of the current horizontal sliding window according to the first horizontal window center; and generating the main lane line by fitting all non-zero pixels of the current horizontal sliding window and all horizontal sliding windows before the current horizontal sliding window.

Similarly, the vehicle-mounted device searches for the right main lane line by: setting the second peak as a starting point for moving the horizontal sliding window, calculating a second average value of the horizontal coordinates of all non-zero pixels in the previous horizontal sliding window of the sliding window; setting the second average value as a second horizontal average value; and determining a second horizontal window center of the current horizontal sliding window according to the second horizontal average value, and determining a position of the current horizontal sliding window according to the second horizontal window center; and generating the right main lane line by fitting all non-zero pixels of the current sliding window and all horizontal sliding windows before the current horizontal sliding window.

In at least one embodiment of the present disclosure, in order to quickly fit the main lane line, the vehicle-mounted device moves the horizontal sliding window according to a straight line in response that the horizontal sliding window moves to an area with fewer non-zero pixels within the range of the BEV image. Because the area may be a gap between dashed lane lines, or blurred lane lines due to weather.

In block 24, the vehicle-mounted device calculates a confidence coefficient of each horizontal sliding window.

In order to determine whether the horizontal sliding window includes the lane line, the confidence coefficient of each horizontal sliding window needs to be calculated. Before calculating the confidence coefficient, a deep neural network model needs to be determined. The deep neural network model is obtained by training a large amount of sample data. For example, the vehicle-mounted device trains the deep neural network model by: obtaining lane line image samples of various road conditions and lighting conditions previously; obtaining learning samples by labeling the pixels where the lane lines are located; generating the deep neural network model by inputting the learning samples into the deep neural network to learn.

In at least one embodiment of present disclosure, the vehicle-mounted device inputs the BEV image containing the horizontal sliding window into a predetermined deep learning neural network model, and calculates a similarity between a pixel feature of each pixel of each horizontal sliding window and the sample feature, and determines a confidence coefficient of each horizontal sliding window based on the similarity. The similarity is proportional to the confidence coefficient, and the higher the similarity, the higher the confidence coefficient. For example, in response that the similarity greater than a predetermined first ratio, and the similarity is calculated based on a pixel feature of the foreground image and the corresponding sample feature. For example, in response that the first ratio is 98%, recording the confidence coefficient as 1. In response that the similarity is less than a predetermined second ratio, for example, the second ratio is 0.2%, then recording the confidence coefficient as 0. The confidence coefficient of the horizontal sliding window is obtained based on the confidence coefficients of all pixels of the horizontal sliding window.

Figure 3:
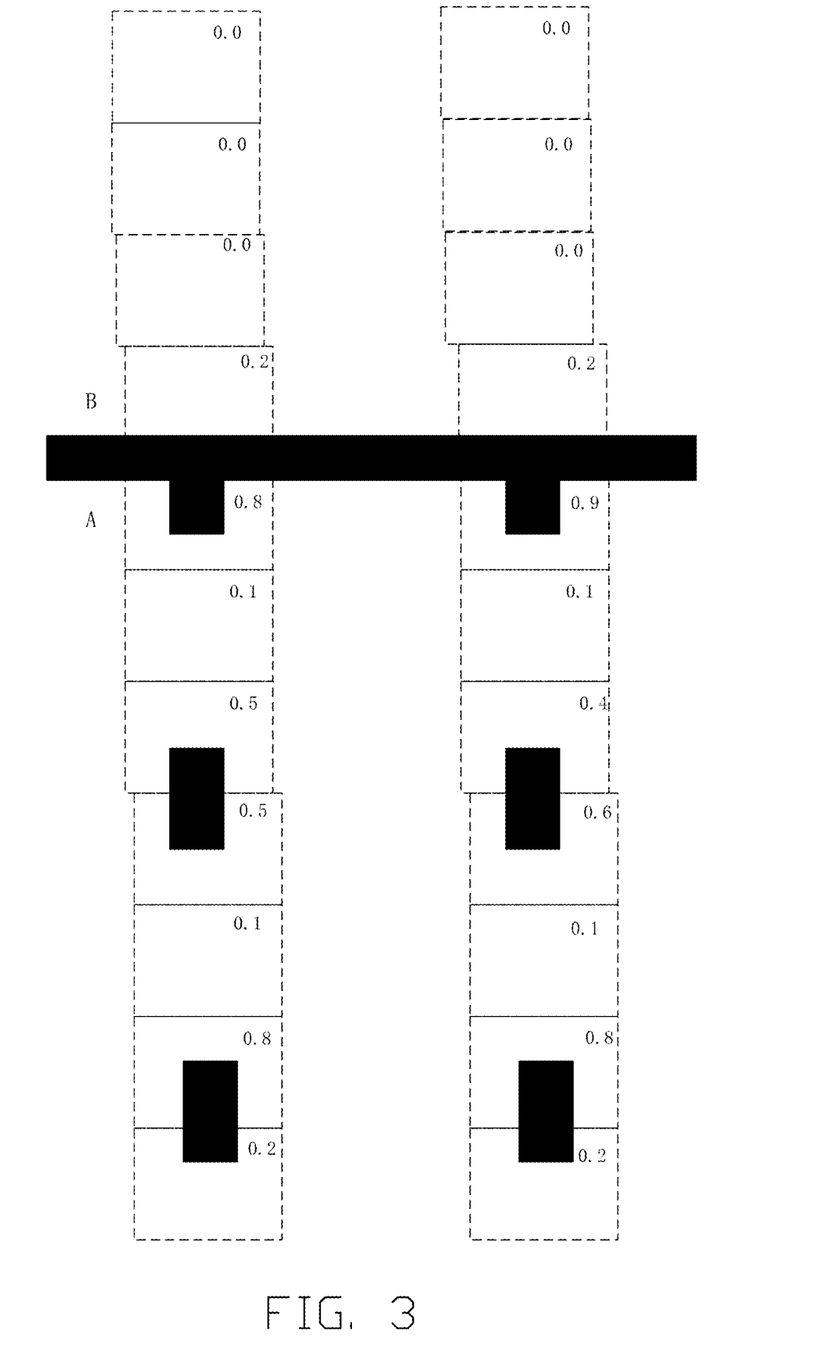
FIG. 3 is a schematic diagram of confidence coefficients of horizontal sliding window provided by an embodiment of the present disclosure.

FIG. 3 is a schematic diagram of confidence coefficient of the sliding windows provided by an embodiment of the present disclosure. As shown in FIG., if there are 240 pixels features of the pixels of the horizontal sliding window A that meet the sample features, the confidence coefficient of the sliding windows is 0.8, and if there are 40 pixels features of the pixels of the horizontal sliding window B that meet the sample features, the confidence coefficient of the sliding windows is 0.2.

In block 25, in response that the multiple confidence coefficients of the preset number of continuous horizontal sliding windows are less than a predetermined threshold, the vehicle-mounted device sets a sliding window that is previous before the preset number of continuous horizontal sliding windows as a previous horizontal sliding window, and determines an end of the main lane line according to the previous horizontal sliding window.

In one embodiment of the present disclosure, after calculating the confidence coefficient of each horizontal sliding window, the vehicle-mounted device compares the confidence coefficient with the predetermined threshold, and when the confidence coefficients of the preset number of continuous horizontal sliding windows are less than a predetermined threshold, the vehicle-mounted device sets a previous one before the preset number of continuous horizontal sliding windows as a previous horizontal sliding window.

Figure 4:
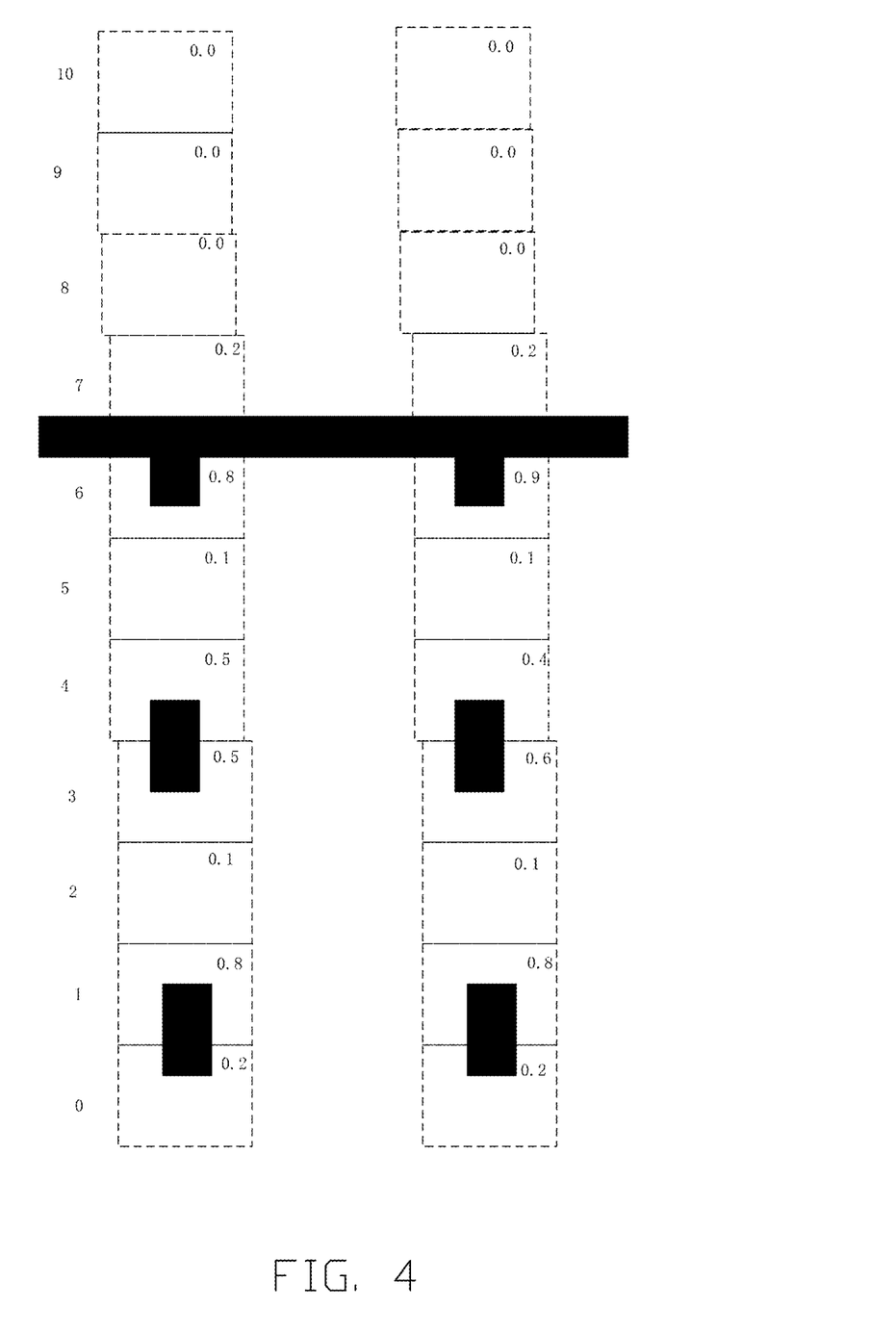
FIG. 4 is a schematic diagram of other confidence coefficients provided by another embodiment of the present disclosure.

FIG. 4 is a schematic diagram of confidence coefficient of the sliding windows provided by an embodiment of the present disclosure. For example, in some examples, when the predetermined threshold is 0.3, and the preset number is 3, as shown in FIG. 4, when the confidence coefficients of the horizontal sliding window 0, the horizontal sliding window 2, the horizontal sliding window 5, the horizontal sliding window 7, the horizontal sliding window 8, the horizontal sliding window 9, and the horizontal sliding window 10 are all less than the predetermined threshold 0.3. The confidence coefficients of the continuous horizontal sliding windows 7, 8, 9, and 10 are less than the predetermined threshold 0.3, setting the horizontal sliding window 6 as the previous horizontal sliding window.

After determining the previous horizontal sliding window, based on the above confidence coefficients, it can be determined that the sliding window moved after the previous horizontal sliding window does not include any lane line, the end of the main lane line is determined according to the previous horizontal sliding window (that is the horizontal sliding window 6).

In an embodiment of the present disclosure, the vehicle-mounted device determines whether the main lane line is included in the BEV image by calculating the confidence coefficients of the horizontal sliding windows, which not only speeds up the speed of fitting the lane line, but also improves the accuracy of lane line recognition.

In block 26, the vehicle-mounted device establishes a vertical histogram according to the BEV image, and sets a peak of the vertical histogram as a starting point while moving the vertical sliding window, generates a target curve by fitting the non-zero pixels of the vertical sliding window, and determines that the target curve is a stop line in response that the end point of the lane line being on the target curve. The vertical histogram is established by the BEV image.

After obtaining the end point of the lane line, in order to further determine whether the position of the end point of the lane line is correct, the vehicle-mounted device establishes the vertical histogram corresponding to the BEV image, and determines whether the position of the end point of the lane line is correct by determining whether the end point of the lane line is on the target curve.

The vehicle-mounted c device sets the peak of the vertical sliding window as the starting point while moving the vertical sliding window, and calculates a second average value of the vertical coordinates of all non-zero pixels in the previous vertical sliding window of the current vertical sliding window. The vehicle-mounted device sets the second average value as a second horizontal coordinate average value, determines a vertical center of the vertical window of the current vertical sliding window according to the second horizontal coordinate average value, and determines a position of the current vertical sliding window according to the determined vertical center. The vehicle-mounted device generates the target curve by fitting the non-zero pixels of the current vertical sliding window and all vertical sliding windows before the current vertical sliding window. When values of the non-zero pixels of the current vertical sliding window are less than the preset non-zero pixel threshold, then the current vertical sliding window will not be fitted. That is, in response that there is no lane line pixel feature in the vertical sliding window, there is no need to fit the vertical sliding window.

After obtaining the target curve, in response that the target curve is consistent with the position of the end of the lane line, the vehicle-mounted device determines that there is a stop line at the end of the lane line. In response that the target curve is different from the position of the end of the lane line, the vehicle-mounted device determines that there is no stop line at the end of the lane line, and the vehicle-mounted device determines that the end of the lane line may be blurred due to external reasons such as weather.

The vehicle-mounted device determines whether target curve is consistent with the position of the end of the lane line by calculating a number of matching degrees between multiple vertical sliding windows corresponding to the target curve and the previous horizontal sliding window, and determining the end point of the lane line is located on the target curve if any one of the matching degrees exceeds the preset matching degree, and determining the position of the stop line according to the position of the target curve and the position of the end point of the lane line. In response that the vertical sliding window moving on the stop line has a high matching degree with the horizontal sliding window, the vehicle-mounted device further confirmed that the end point of the lane line obtained is correct, and it is not due to blurred lane lines, weak light or weather. In response that the target curve is not the stop line, the vertical sliding window moving on the stop line has a low matching degree with the horizontal sliding window, then the position of the target curve is not the end of the lane line. The lane line may be blurred due to weather, and an early warning that the vehicle-mounted device fails to recognize the main lane lines is output.

Figure 5:
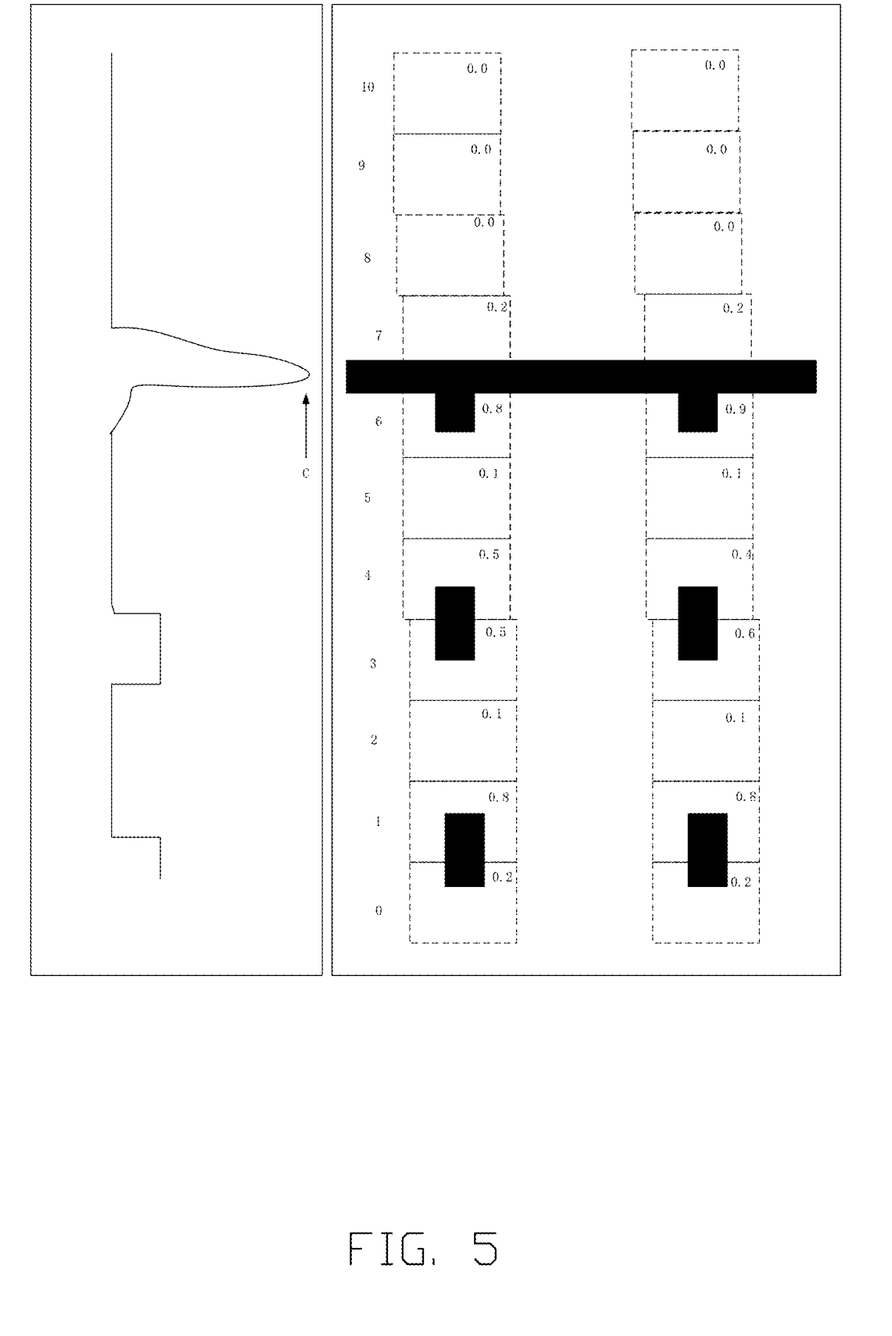
FIG. 5 is a flowchart of a lane line detection method provided by another embodiment of the present disclosure.

FIG. 5 is a flowchart of a lane line detection method provided by an embodiment of the present disclosure.

In some embodiments, as shown in FIG. 5, when the vehicle-mounted device establishes the vertical histogram based on the left side of the BEV image, a point C is the peak of the vertical histogram. The vehicle-mounted device sets the point C as the starting point for moving the vertical sliding window on the right side of the BEV image, and fits the target curve according to the moving vertical sliding window. When the point C is located at the position of the previous horizontal sliding window (for example, horizontal sliding window 6), the vehicle-mounted device determines that the point C and the previous horizontal sliding window 6 are located on the stop line.

Figure 6:
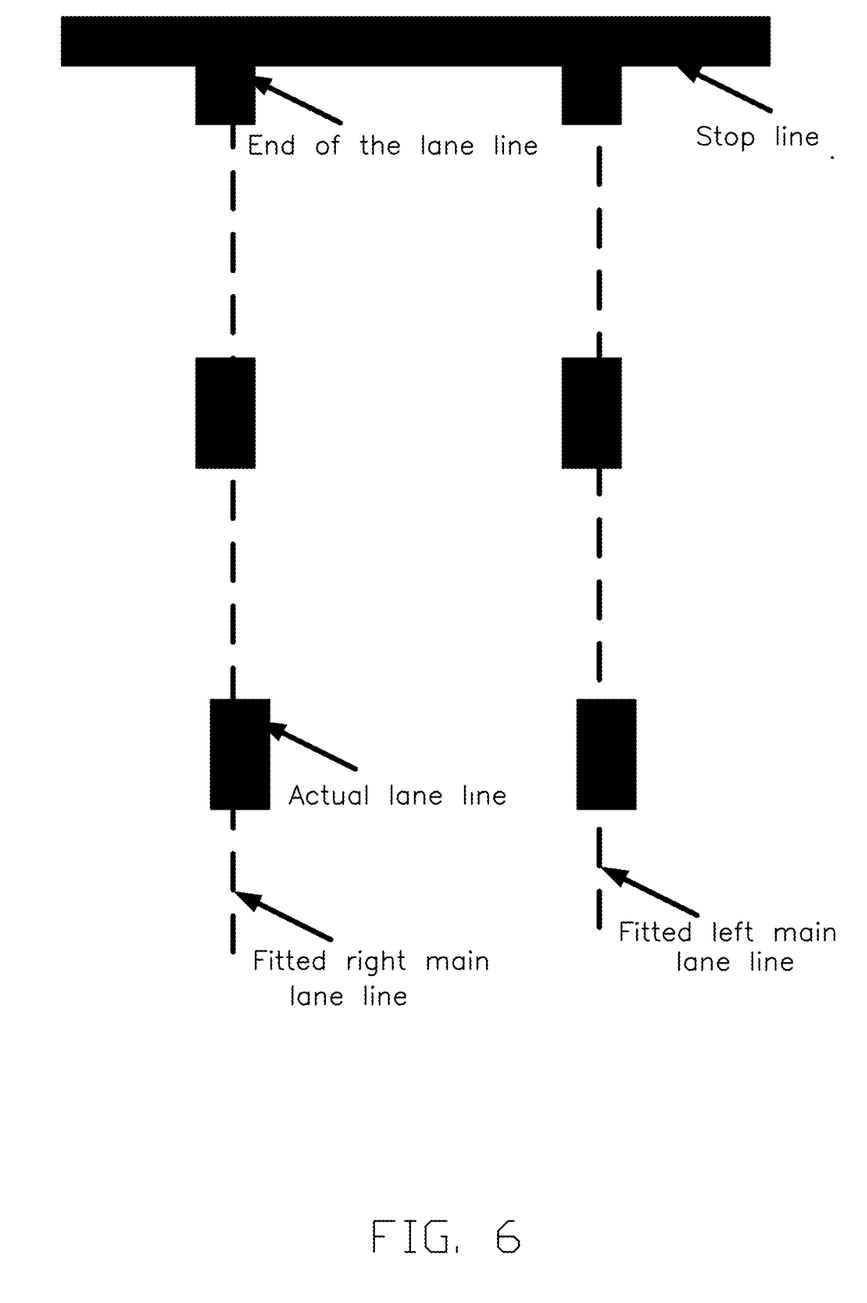
FIG. 6 is a schematic diagram of a lane line provided by an embodiment of the present disclosure.

FIG. 6 is a schematic diagram of lane lines provided by an embodiment of the present disclosure.

After determining the stop line, filtering out the preset number of continuous horizontal sliding windows, such as the horizontal sliding windows 7, 8, 9, and 10 in FIG. 5. For example, the vehicle-mounted device sets the horizontal sliding windows 7, 8, 9, and 10 as noise and discard them. As shown in FIG. 6, the vehicle-mounted device obtains the lane line including the end point and the stop line the by fitting pixels of the filtered horizontal sliding windows. Compared with the actual lane lines, the lane lines fitted by discarding the noise have a higher degree of matching with the actual lane lines, which is convenient for assisted driving in the intelligent driving mode and improves driving safety and the driver's driving experience.

In an embodiment of the present disclosure, firstly, the foreground image of the vehicle is acquired by the photographing device, and the foreground image is converted into a BEV image. The horizontal histogram corresponding to the BEV image is established, and the peak of the horizontal histogram is used as the starting point for moving the sliding window, the vehicle-mounted device generates the main lane lines by fitting the non-zero pixels of the horizontal sliding window. In one embodiment, the main lane lines include the left main lane line and the right main lane line. Then, the vehicle-mounted device calculates the confidence coefficient of each horizontal sliding window, in response that the confidence coefficients of preset number of continuous horizontal sliding windows are less than the predetermined threshold, the vehicle-mounted device sets a previous one before the preset number of continuous horizontal sliding windows as a previous horizontal sliding window and determines the end point of the lane line of the main lane line according to the previous horizontal sliding window. Finally, in order to avoid blurring of lane lines due to external factors such as weather, which would lead to inaccurate recognition of the end point of lane lines, the vehicle-mounted device establishes a vertical histogram corresponding to the BEV image, and sets the peak of the vertical histogram as the starting point of the moving vertical sliding window. By fitting the vertical non-zero pixels of the sliding window generate a target curve, and when the end point of the lane line is located on the target curve, the target curve is a stop line. The present disclosure can improve the accuracy of identifying lane lines.

Referring to FIG. 1, in this embodiment, the storage device 11 may be an internal memory of the vehicle-mounted device 1, i.e., the storage device 11 is embedded in the vehicle-mounted device 1. In other embodiments, the storage device 11 may also be an external memory of the vehicle-mounted device 1, i.e., the storage device 11 is external connected to the vehicle-mounted device 1.

In some embodiments, the storage device 11 is used to store program code and various data and to enable high-speed, automatic access to the program or data during operation of the vehicle-mounted device 1.

The storage device 11 may include random access memory and may also include non-volatile memory such as a hard disk, memory, plug-in hard disk, Smart Media Card (SMC), Secure Digital (SD) card, Flash Card, at least one disk memory device, flash memory device, or other volatile solid state memory device.

In one embodiment, the at least one processor 12 may be a Central Processing Unit (CPU), and may also be other general purpose processors, Digital Signal Processor (DSP), Application Specific Integrated Circuit (ASIC), or other volatile solid state memory devices, Integrated Circuit (ASIC), Field-Programmable Gate Array (FPGA) or other programmable logic device, discrete gate or transistor logic device, discrete hardware component, etc. The general-purpose processor may be a microprocessor or the processor may also be any other conventional processor, etc.

The program code and various data in the storage device 11 may be stored in a computer readable storage medium if implemented as a software functional unit and sold or used as a separate product. Based on such an understanding, the present disclosure realizes all or part of the processes in the method of the above-described embodiments, such as the lane line detection method, which may also be accomplished by means of a computer program to instruct the relevant hardware, the computer program may be stored in a computer readable storage medium, and the computer program, when executed by a processor, may implement the blocks of each of the above-described method embodiments. The computer program includes computer program code, the computer program code may be in the form of source code, in the form of object code, in the form of an executable file or in some intermediate form, etc. The computer readable medium may include: any entity or device capable of carrying said computer program code, a recording medium, a USB stick, a removable hard disk, a diskette, an optical disk, a computer memory, a read-only memory (ROM, Read-Only Memory), etc.

It is understood that the division of modules described above is a logical functional division, and there can be another division in actual implementation. In addition, each functional module in each embodiment of the present disclosure may be integrated in the same processing unit, or each module may physically exist separately, or two or more modules may be integrated in the same unit. The above integrated modules can be implemented either in the form of hardware or in the form of hardware plus software functional modules. The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A lane line detection method using a vehicle-mounted device, the method comprising:
   obtaining a foreground image of a vehicle;
   converting the foreground image into a bird's eye view (BEV) image;
   establishing a horizontal histogram image corresponding to the BEV image;

setting a peak of the horizontal histogram as a starting point while moving a horizontal sliding window, and generating a main lane line by fitting a plurality of non-zero pixels of the horizontal sliding window;

calculating a confidence coefficient of each horizontal sliding window;

in response that a plurality of confidence coefficients of a preset number of continuous horizontal sliding windows are less than a predetermined threshold, setting a sliding window that is previous before the preset number of continuous horizontal sliding windows as a previous horizontal sliding window, and determining an end of the main lane line according to the previous horizontal sliding window; and establishing a vertical histogram according to the BEV image, and setting a peak of the vertical histogram as a starting point while moving a vertical sliding window;

generating a target curve by fitting non-zero pixels of the vertical sliding window; and determining that the target curve is a stop line in response that an end point of the lane line being on the target curve.

2. The lane line detection method according to claim 1, wherein converting the foreground image into the BEV image comprises:

obtaining a corrected image by performing a distortion correction on the foreground image, and setting each non-zero pixel of the corrected image as a target point;

obtaining an inverse perspective transformation matrix by performing a coordinate transformation on each target point of the corrected image; and converting the corrected image to the BEV image according to the inverse perspective transformation matrix.

3. The lane line detection method according to claim 1, wherein setting the peak of the horizontal histogram as the starting point while moving the horizontal sliding window, and generating the main lane line by fitting the plurality of non-zero pixels of the horizontal sliding window comprises:

setting the peak of the horizontal histogram as the starting point for moving the horizontal sliding window;

calculating a first average value of the horizontal coordinates of all non-zero pixels in the previous horizontal sliding window of a current horizontal sliding window;

setting the first average value as a first horizontal coordinate average value;

determining a horizontal center of the current horizontal sliding window according to the first horizontal coordinate average value;

determining a position of the current horizontal sliding window according to the determined horizontal center; and generating the main lane line by fitting all the non-zero pixels of the current horizontal sliding window and all horizontal sliding windows before the current horizontal sliding window.

4. The lane line detection method according to claim 1, wherein calculating the confidence coefficient of each horizontal sliding window comprises:

inputting the BEV image comprising the horizontal sliding window into a predetermined deep learning neural network model;

calculating a similarity between a pixel feature of each pixel of each horizontal sliding window and a sample feature; and determining the confidence coefficient of each horizontal sliding window based on the similarity, the similarity being proportional to the confidence coefficient.

5. The lane line detection method according to claim 1, wherein setting the peak of the vertical histogram as the starting point while moving the vertical sliding window and generating the target curve by fitting the plurality of non-zero pixels of the vertical sliding window comprises:

setting a peak of the vertical sliding window as the starting point while moving the vertical sliding window;

calculating a second average value of the vertical coordinates of all non-zero pixels in the previous vertical sliding window of a current vertical sliding window;

setting the second average value as a second vertical coordinate average value;

determining a vertical center of the current vertical sliding window according to the second vertical coordinate average value;

determining a position of the current vertical sliding window according to the determined vertical center; and generating the target curve by fitting all the non-zero pixels of the current vertical sliding window and all vertical sliding windows before the current vertical sliding window.

6. The lane line detection method according to claim 1, wherein determining that the target curve is the stop line in response that the end point of the lane line being on the target curve comprises:

calculating at least one matching degree between a plurality of vertical sliding windows corresponding to the target curve and the previous horizontal sliding window;

determining the end of the main lane line is located on the target curve in response that any one of the at least one matching degree exceeds a preset matching degree; and determining the position of the stop line according to the position of the target curve and the position of the end of the main lane line.

7. The lane line detection method according to claim 6, wherein after determining the target curve is the stop line, the method further comprises:

filtering out the preset number of continues horizontal sliding windows.

8. A vehicle-mounted device comprising:

a storage device;

at least one processor; and the storage device storing one or more programs, which when executed by the at least one processor, cause the at least one processor to:

obtain a foreground image of a vehicle;

convert the foreground image into a bird's eye view (BEV) image;

establish a horizontal histogram image corresponding to the BEV image;

set a peak of the horizontal histogram as a starting point while moving a horizontal sliding window, and generate a main lane line by fitting a plurality of non-zero pixels of the horizontal sliding window;

calculate a confidence coefficient of each horizontal sliding window;

in response that a plurality of confidence coefficients of a preset number of continuous horizontal sliding windows are less than a predetermined threshold, set a sliding window that is previous before the preset number of continuous horizontal sliding windows as a previous horizontal sliding window, and determine an end of the main lane line according to the previous horizontal sliding window; and establish a vertical histogram according to the BEV image, and set a peak of the vertical histogram as a starting point while moving a vertical sliding window;

generate a target curve by fitting non-zero pixels of the vertical sliding window; and determine that the target curve is a stop line in response that an end point of the lane line being on the target curve.

9. The vehicle-mounted device according to claim 8, wherein the at least one processor converts the foreground image into the BEV image by:

obtaining a corrected image by performing a distortion correction on the foreground image;

setting each non-zero pixel of the corrected image as a target point;

obtaining an inverse perspective transformation matrix by performing a coordinate transformation on each target point of the corrected image; and converting the corrected image to the BEV image according to the inverse perspective transformation matrix.

10. The vehicle-mounted device according to claim 8, wherein the at least one processor sets the peak of the horizontal histogram as the starting point while moving the horizontal sliding window, and generates the main lane line by fitting the plurality of non-zero pixels of the horizontal sliding window by:

setting the peak of the horizontal histogram as the starting point for moving the horizontal sliding window;

calculating a first average value of the horizontal coordinates of all non-zero pixels in the previous horizontal sliding window of a current horizontal sliding window;

setting the first average value as a first horizontal coordinate average value;

determining a horizontal center of the current horizontal sliding window according to the first horizontal coordinate average value;

determining a position of the current horizontal sliding window according to the determined horizontal center; and generating the main lane line by fitting all the non-zero pixels of the current horizontal sliding window and all horizontal sliding windows before the current horizontal sliding window.

11. The vehicle-mounted device according to claim 8, wherein the at least one processor calculates the confidence coefficient of each horizontal sliding window by:

inputting the BEV image comprising the horizontal sliding window into a predetermined deep learning neural network model;

calculating a similarity between a pixel feature of each pixel of each horizontal sliding window and a sample feature; and determining the confidence coefficient of each horizontal sliding window based on the similarity, the similarity being proportional to the confidence coefficient.

12. The vehicle-mounted device according to claim 8, wherein the at least one processor sets the peak of the vertical histogram as the starting point while moving the vertical sliding window and generates the target curve by fitting the plurality of non-zero pixels of the vertical sliding window by:

setting a peak of the vertical sliding window as a starting point while moving the vertical sliding window;

calculating a second average value of the vertical coordinates of all non-zero pixels in the previous vertical sliding window of a current vertical sliding window;

setting the second average value as a second vertical coordinate average value;

determining a vertical center of the current vertical sliding window according to the second vertical coordinate average value;

determining a position of the current vertical sliding window according to the determined vertical center; and generating the target curve by fitting all the non-zero pixels of the current vertical sliding window and all vertical sliding windows before the current vertical sliding window.

13. The vehicle-mounted device according to claim 8, wherein the at least one processor determines that the target curve is the stop line in response that the end point of the lane line being on the target curve by:

calculating at least one matching degree between a plurality of vertical sliding windows corresponding to the target curve and the previous horizontal sliding window;

determining the end of the main lane line is located on the target curve in response that any one of the at least one matching degree exceeds a preset matching degree; and determining the position of the stop line according to the position of the target curve and the position of the end of the main lane line.

14. The vehicle-mounted device according to claim 13, wherein after determining the target curve is the stop line, the at least one processor is further caused to:

filtering out the preset number of continues horizontal sliding windows.

15. A non-transitory storage medium having instructions stored thereon, when the instructions are executed by a processor of a vehicle-mounted device, the processor is caused to perform a lane line detection method, wherein the method comprises:

obtaining a foreground image of a vehicle;

converting the foreground image into a bird's eye view (BEV) image;

establishing a horizontal histogram image corresponding to the BEV image;

setting a peak of the horizontal histogram as a starting point while moving a horizontal sliding window, and generating a main lane line by fitting a plurality of non-zero pixels of the horizontal sliding window;

calculating a confidence coefficient of each horizontal sliding window;

in response that a plurality of confidence coefficients of a preset number of continuous horizontal sliding windows are less than a predetermined threshold, setting a sliding window that is previous before the preset number of continuous horizontal sliding windows as a previous horizontal sliding window, and determining an end of the main lane line according to the previous horizontal sliding window; and establishing a vertical histogram according to the BEV image, and setting a peak of the vertical histogram as a starting point while moving a vertical sliding window;

generating a target curve by fitting non-zero pixels of the vertical sliding window; and determining that the target curve is a stop line in response that an end point of the lane line being on the target curve.

16. The non-transitory storage medium according to claim 15, wherein the converting the foreground image into the BEV image comprises:
- obtaining a corrected image by performing a distortion correction on the foreground image, and setting each non-zero pixel of the corrected image as a target point;
- obtaining an inverse perspective transformation matrix by performing a coordinate transformation on each target point of the corrected image; and
- converting the corrected image to the BEV image according to the inverse perspective transformation matrix.

17. The non-transitory storage medium according to claim 15, wherein setting the peak of the horizontal histogram as the starting point while moving the horizontal sliding window, and generating the main lane line by fitting the plurality of non-zero pixels of the horizontal sliding window comprises:
- setting the peak of the horizontal histogram as the starting point for moving the horizontal sliding window;
- calculating a first average value of the horizontal coordinates of all non-zero pixels in the previous horizontal sliding window of a current horizontal sliding window;
- setting the first average value as a first horizontal coordinate average value;
- determining a horizontal center of the current horizontal sliding window according to the first horizontal coordinate average value;
- determining a position of the current horizontal sliding window according to the determined horizontal center; and
- generating the main lane line by fitting all the non-zero pixels of the current horizontal sliding window and all horizontal sliding windows before the current horizontal sliding window.

18. The non-transitory storage medium according to claim 15, wherein calculating the confidence coefficient of each horizontal sliding window comprises:
- inputting the BEV image comprising the horizontal sliding window into a predetermined deep learning neural network model;
- calculating a similarity between a pixel feature of each pixel of each horizontal sliding window and a sample feature; and
- determining the confidence coefficient of each horizontal sliding window based on the similarity, the similarity being proportional to the confidence coefficient.

19. The non-transitory storage medium according to claim 15, wherein setting the peak of the vertical histogram as the starting point while moving the vertical sliding window and generating the target curve by fitting the plurality of non-zero pixels of the vertical sliding window comprises:
- setting a peak of the vertical sliding window as a starting point while moving the vertical sliding window;
- calculating a second average value of the vertical coordinates of all non-zero pixels in the previous vertical sliding window of a current vertical sliding window;
- setting the second average value as a second vertical coordinate average value;
- determining a vertical center of the current vertical sliding window according to the second vertical coordinate average value;
- determining a position of the current vertical sliding window according to the determined vertical center; and
- generating the target curve by fitting all the non-zero pixels of the current vertical sliding window and all vertical sliding windows before the current vertical sliding window.

20. The non-transitory storage medium according to claim 15, wherein determining that the target curve is the stop line in response that the end point of the lane line being on the target curve comprises:
- calculating at least one matching degree between a plurality of vertical sliding windows corresponding to the target curve and the previous horizontal sliding window;
- determining the end of the main lane line is located on the target curve in response that any one of the at least one matching degree exceeds a preset matching degree; and
- determining the position of the stop line according to the position of the target curve and the position of the end of the main lane line.

* * * * *